3,532,366
CONSTRICTIVE SHRINK FITTINGS MADE OF ISOTACTIC POLYBUTENE-1

Julius P. Rakus, Basking Ridge, Robert J. Schaffhauser, Morristown, and Charles D. Mason, Florham Park, N.J., assignors to Allied Chemical Corporation, New York, N.Y., a corporation of New York
No Drawing. Filed Nov. 19, 1965, Ser. No. 508,843
Int. Cl. F16l *13/00, 47/00*
U.S. Cl. 285—292                                    2 Claims

ABSTRACT OF THE DISCLOSURE

In situ formed constrictive shrink fittings composed of polybutene-1 having an average molecular weight of from about 100,000 to 1,500,000 and an isotactic content of from about 70% to 98% are useful for applications such as joining pipes, clamping bodies together and sealing exposed surfaces.

---

This invention relates to constrictive structures useful as pipe couplings, caps and the like. More particularly, this invention relates to constrictive structures composed essentially of isotactic polybutene-1 resins.

In joining pipes, fittings are commonly used. However, the fittings must match the pipe and are not only expensive but require that the pipes be machined to match the threads of the fitting. Furthermore, where pipes of a variety of diameters are used, the applicator is required to maintain a stock of fittings of various sizes. Fittings are also disadvantageously sensitive to stretching and bending.

Joining pipes by welding is expensive as it requires high skill and in general gives low strength joints.

In recent years the use of non-metallic pipe has expanded rapidly. Some non-metallic pipes may be joined by adhesives. The polyolefin pipes, e.g. polyethylene, polypropylene and polybutene-1 resin, are highly desirable due to their inherent physical chemical properties; however, they are difficult to bond with adhesives and the use of fittings has the disadvantages discussed above.

Accordingly, it would be desirable to join pipes by a means other than welding or by adhesives and also to avoid the problem of matching and stocking ready-made fittings for pipes of various diameters by the use of a coupling or fitting which is formed in place. It would also be desirable to join pipes without the need of treating the surface of the pipe by priming or machining. Accordingly, it would be desirable to join pipes with a constrictive band-like structure of a material which could be formed in place. Such a material would have to be easily handled and applied, and relatively low in cost and have physical and chemical properties required for such use. It would also be desirable to use constrictive structures for similar applications including clamping bodies together, sealing caps or stoppers on vessels, capping narrow-mouthed vessels, protecting exposed screw threads, etc.

Materials heretofore utilized as constrictive structures for such application were not entirely satisfactory because they were difficult to apply, were expensive, or were lacking in physical, mechanical, or chemical properties.

Accordingly, an object of this invention is to provide constrictive structures which are relatively inexpensive, may be easily formed in place and do not require treatment of the surface of the body to which they are to be applied.

A further object is to provide constrictive structures which are rigid, resilient, and impact-resistant, are solid at 100° C., are water-impervious and resistant to a wide variety of solvents and chemicals, are resistant to attack by microorganisms and are not repellent or harmful to animal life.

A still further objective of this invention is to provide improved pipe couplings, clamping means, protective seals, caps and bands and the like.

It has now been discovered that these and other objectives are achieved by the constrictive structures of this invention, which structures are composed essentially of certain isotactic polybutene-1 resins.

Isotactic polybutene-1 resins are of relatively recent origin, being unavailable before about 1955. They are highly crystalline and are quite distinct from the amorphous, rubbery butene polymers which are well known in the art.

The expression "isotactic" is used herein in its conventional sense to mean the material in the polymer remaining after extraction with diethyl ether; the isotactic material is substantially insoluble in hexane and naphtha. The diethyl ether extraction removes the amorphous or atactic material (which is the material soluble in hexane and naphtha) and leaves a polymer containing the isotactic material.

The isotactic polybutene-1 resins employed in this invention are characterized by having average molecular weights in the range of from about 100,000 to 1,500,000, preferably from about 200,000 to 800,000; and percent isotacticity in the range of from about 70 to 98%, preferably from about 90 to 98, such resins soften at temperatures of from about 115 to 140° C.

The isotactic polybutene-1 resins employed in this invention can be prepared by polymerizing butene-1 using a so-called "Ziegler-type" catalyst and conducting the polymerization under conditions to produce a polymer having the desired isotactic content of at least 70% and desired molecular weight of at least 100,000. Any of the known Ziegler catalysts can be used; for example, catalysts obtained by reaction between compounds of metals of group IV–A (titanium, zirconium or hafnium), V–A (vanadium, columbium or tantalum), VI–A (chromium, molybdenum or tungsten) with alkyl compounds of aluminum or a metal of group II (beryllium, magnesium, calcium, strontium, barium, zinc or cadmium). In all cases the polymerization must be timed and moderated to produce isotactic polybutene-1 resins having the desired molecular weight and isotactic content. Hydrogen can be introduced into the polymerization reaction mixture to control the molecular weight and percent isotacticity.

The isotactic polybutene-1 resins of this invention are conveniently handled since they melt at moderate temperatures. Molten compositions of this invention range in viscosity from oily to doughy, depending on such factors as the temperature, average molecular weight and the percent of isotacticity of the polybutene-1 resin and the nature and amounts of modifying materials which can be added to the resin.

In the practice of this invention a composition of this invention is applied in the molten state to a substrate to form a band-like structure of the desired shape. On cooling, the composition solidifies firmly in place, around the substrate having shrunk slightly due to the change from a molten to a solid phase. On standing at ambient temperatures the structure continued to shrink for about 48 hours at which time a maximum constrictive effect is obtained.

The constrictive structure of this invention fails to show exceptional strength if tested soon after solidification but tests have shown that where the structure is allowed to stand for sufficient time to undergo the additional shrinkage, pipe couplings exceeding the standard requirements for longitudinal force are obtained. This is surprisingly unexpected as isotactic polypropylene, which is a closely related member of the same class of polymers is unsuitable as a resin of this invention.

The additional shrinkage exhibited by the isotactic polybutene-1 resins of this invention after solidification is suspected to be due to a change in the crystalline structure of the resins from an unstable form to a more stable form, although the inventors do not wish to be bound by this theory.

The composition of this invention can conveniently be applied by such means as melting in a suitable vessel and then poured or troweled into place, or applied in the solid phase and then melted in place by the application of heat. It is advantageous to subject the formed structure to a squeezing pressure while still plastic to obtain closer conformity of the structure to the contours of the surface of the substrate, or modeled to obtain a desired configuration or surface effect. The application of the composition of the invention does not require a high degree of skill in the practictioner or complex or expensive apparatus.

Suitable extenders, fillers, reinforcing fibers, colorants, impact-modifiers, stabilizers and the like may conveniently be added in limited amounts to the isotactic polybutene-1 resin for use in this invention.

The constrictive structures of this invention are held firmly in place due to a gripping action, i.e. a constrictive force, rather than adhesion, of the structure to the substrate. For this reason no special preparation of the surface of the substrate is required, however it is advantageous to roughen or score the surface of the substrate to provide a better gripping surface for the constrictive structure.

Two polybutene-1 resin pipes of one inch in diameter were placed end to end in a coaxial alignment. Polybutene-1 resin having an average molecular weight of about 600,000, an isotactic content of about 93%, and a melting point of 118° C. was placed in a vessel and melted at a temperature of about 10° to 30° C. above its melting point. The molten polymer was troweled onto the junction of the two pipes to form a band tapering from its center from about ½ to ¼ inch in thickness and covering about one inch of the length of each pipe. The junction area was rapidly cooled by running cold water over it while the pipes were firmly maintained in place. The band was modeled by hand while still plastic to form a more regular shape. The band solidified to a hard tough body which firmly coupled the pipes in the aligned relationship. The pipes thus coupled were stored for about a week and then tested for tensile strength according to ASTM D-638 using an Instron tensile testing machine by applying 2 inch per minute constant rate of loading.

The coupling so produced failed at over 1000 pounds longitudinal force. The standard for a one inch isotactic polybutene-1 pipe coupling is 640 pounds longitudinal force; thus the polybutene-1 resin coupling exceeded the standard requirement.

Satisfactory couplings were similarly formed to join isotactic polybutene-1 resin, polyethylene and steel pipes. The joined pipes were tested one week after forming by applying tension. A 1 inch isotactic polybutene-1 resin pipe, having a 1000 p.s.i. design stress, has to withstand a 640 pound longitudinal force. A one inch pipe coupled by the process of this invention withstood well above 1000 pounds longitudinal stress. A similar coupling did not fail when subjected to repeated applications of tension (700 cycles between 200 and 900 pounds at a speed of 20 inches per minute). Isotactic polybutene-1 resin joints when formed on polyethylene and steel pipe gave lower, but still satisfactory strength.

Isotactic polypropylene couplings similarly formed to join isotactic polybutene-1 resin pipe failed at 460 pounds longitudinal stress. The failure of the isotactic polypropylene joint indicates that shrinkage occurring upon solidification of a polyolefin is insufficient to form a strong joint. However, the solidification shrinkage of the isotactic polybutene-1 resins of this invention plus the additional shrinkage provides the strength needed for all normal applications. This fact was substantiated by several experiments using polybutene-1 resins with molecular weights of 200,000, 350,000 and 600,000. For example, a coupling of polybutene-1 resin of a molecular weight of 200,000 and 94% isotacticity withstood a 420 pounds longitudinal stress for ½ inch isotactic polybutene-1 resin pipe; the requirements for which pipe is 328 pounds.

We claim:

1. The combination of at least two pipes joined in end-to-end relationship by a pipe coupling which is a band-like constrictive structure surrounding the pipe juncture, which coupling is composed essentially of polybutene-1 resin having an average molecular weight of from 100,000 to 1,500,000 and an isotactic content of from about 70% to 98%, and is held firmly in place around the pipe juncture by the gripping action resulting from shrinkage, which coupling is formed in place by forming a molten band-like body of the polybutene-1 resin around the pipe juncture, solidifying the polybutene-1 resin, and allowing the resulting pipe coupling to contract in place for an additional period of about 48 hours.

2. The combination of claim 1 wherein the polybutene-1 resin has an average molecular weight of from about 200,000 to 800,000 and an isotactic content of from about 90% to 98%.

References Cited

UNITED STATES PATENTS

| 3,243,211 | 3/1966 | Wetmore | 287—78 |
| 3,265,648 | 8/1966 | Boor et al. | 260—93.7 |
| 3,315,986 | 4/1967 | Quick | 285—21 |
| 3,299,029 | 1/1967 | Binsbergen et al. | 260—93.7 |
| 3,314,930 | 4/1967 | Nagel | 260—93.7 |
| 3,244,685 | 4/1966 | Nagel | 260—93.7 |

FOREIGN PATENTS

| 876,606 | 9/1961 | Great Britain. |

OTHER REFERENCES

Boor et al.: J. Poly. Sci., Pt. A, vol. 1 (1963), pp. 59, 60, 65–69, 75–79, 81 and 82.

JOSEPH L. SCHOFER, Primary Examiner

E. J. SMITH, Assistant Examiner

U.S. Cl. X.R.

264—230, 249, 261; 285—381, 423